US009146930B2

(12) United States Patent
Tang

(10) Patent No.: US 9,146,930 B2
(45) Date of Patent: Sep. 29, 2015

(54) METHOD AND APPARATUS FOR FILE STORAGE

(71) Applicant: BEIJING XIAOMI Technology CO., LTD., Beijing (CN)

(72) Inventor: Mengsong Tang, Shenzhen (CN)

(73) Assignee: Tencent Technology (Shenzhen) Company, Limited, Shenzhen, Guangdong (CN)

(*) Notice: Subject to any disclaimer, the term of this patent is extended or adjusted under 35 U.S.C. 154(b) by 176 days.

(21) Appl. No.: 13/963,434

(22) Filed: Aug. 9, 2013

(65) Prior Publication Data
US 2014/0019494 A1 Jan. 16, 2014

Related U.S. Application Data

(63) Continuation of application No. PCT/CN2013/079084, filed on Jul. 9, 2013.

(30) Foreign Application Priority Data

Jul. 10, 2012 (CN) .......................... 2012 1 02384276

(51) Int. Cl.
G06F 17/30 (2006.01)
(52) U.S. Cl.
CPC .... *G06F 17/30117* (2013.01); *G06F 17/30091* (2013.01)
(58) Field of Classification Search
None
See application file for complete search history.

(56) References Cited

U.S. PATENT DOCUMENTS

| 8,332,357 B1* | 12/2012 | Chung .......................... 707/634 |
| 8,353,012 B2* | 1/2013 | Del Real .......................... 726/4 |
| 8,849,777 B1* | 9/2014 | Xing .............................. 707/695 |
| 2006/0179037 A1 | 8/2006 | Turner et al. |
| 2010/0257218 A1* | 10/2010 | Vassilev et al. ............... 707/823 |
| 2013/0103729 A1* | 4/2013 | Cooney et al. ................ 707/831 |
| 2013/0282776 A1* | 10/2013 | Durrant et al. ................ 707/827 |

FOREIGN PATENT DOCUMENTS

| CN | 1975721 A | 6/2007 |
| CN | 101719141 A | 6/2010 |
| CN | 102033938 A | 4/2011 |
| WO | WO2010150750 A1 | 12/2010 |

OTHER PUBLICATIONS

International Search Report received in related PCT Application No. PCT/CN2013/079084 dated Oct. 10, 2013.

* cited by examiner

*Primary Examiner* — Hung Le
(74) *Attorney, Agent, or Firm* — Brinks Gilson & Lione

(57) ABSTRACT

A method and apparatus for file storage is disclosed, wherein the method comprises: recording meta-data information of a folder, and storing the meta-data information into key-value databases; and, when the folder includes at least one sub-folder list and/or file list thereunder, storing the contents of the at least one sub-folder list and/or file list included under the folder in secondary keys based on the primary key. The method achieves "open ended" unlimited expansion of data in a directory tree storage. The use of the "open ended" unlimited data expansion scheme avoids bottlenecks related to underlying data storage when accumulated data become large. In comparison with the prior art method, the method splits and stores large data into multiple secondary keys for uniform data distribution, thereby enhances storage stability of storage databases and facilitates data expansion and systems' transaction operations.

18 Claims, 12 Drawing Sheets

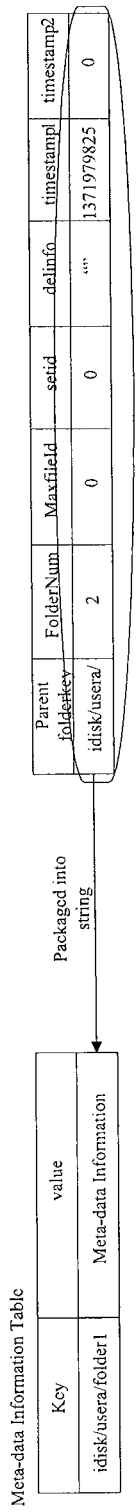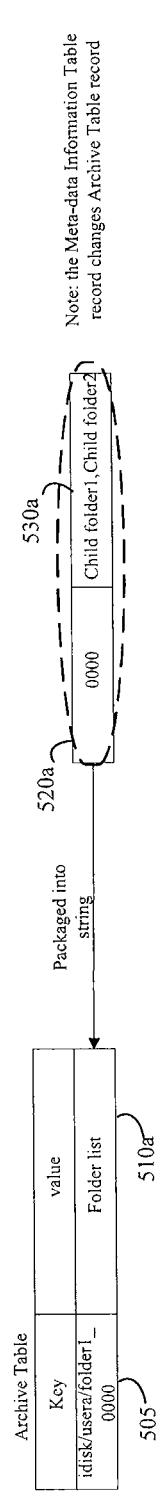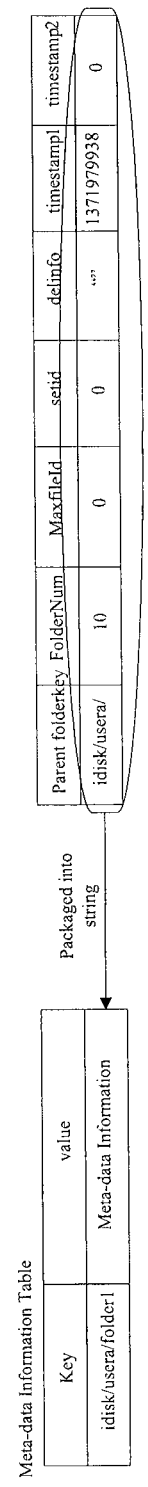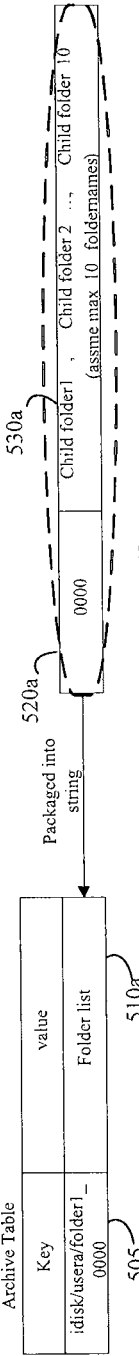
Fig. 5E
Fig. 5F

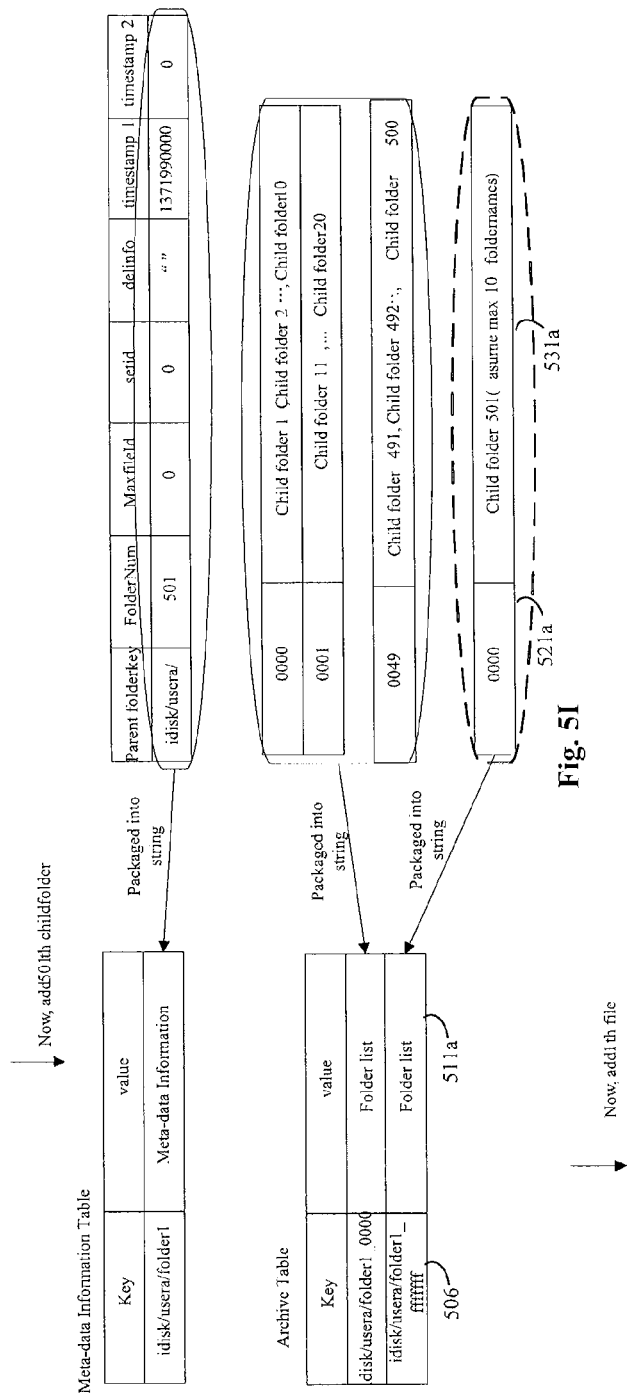
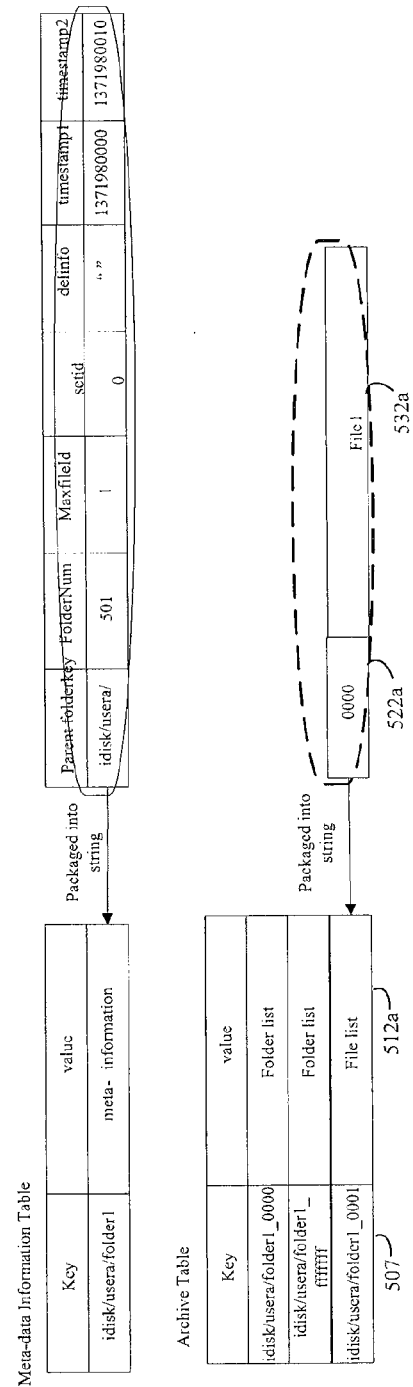
Fig. 5I
Fig. 5J

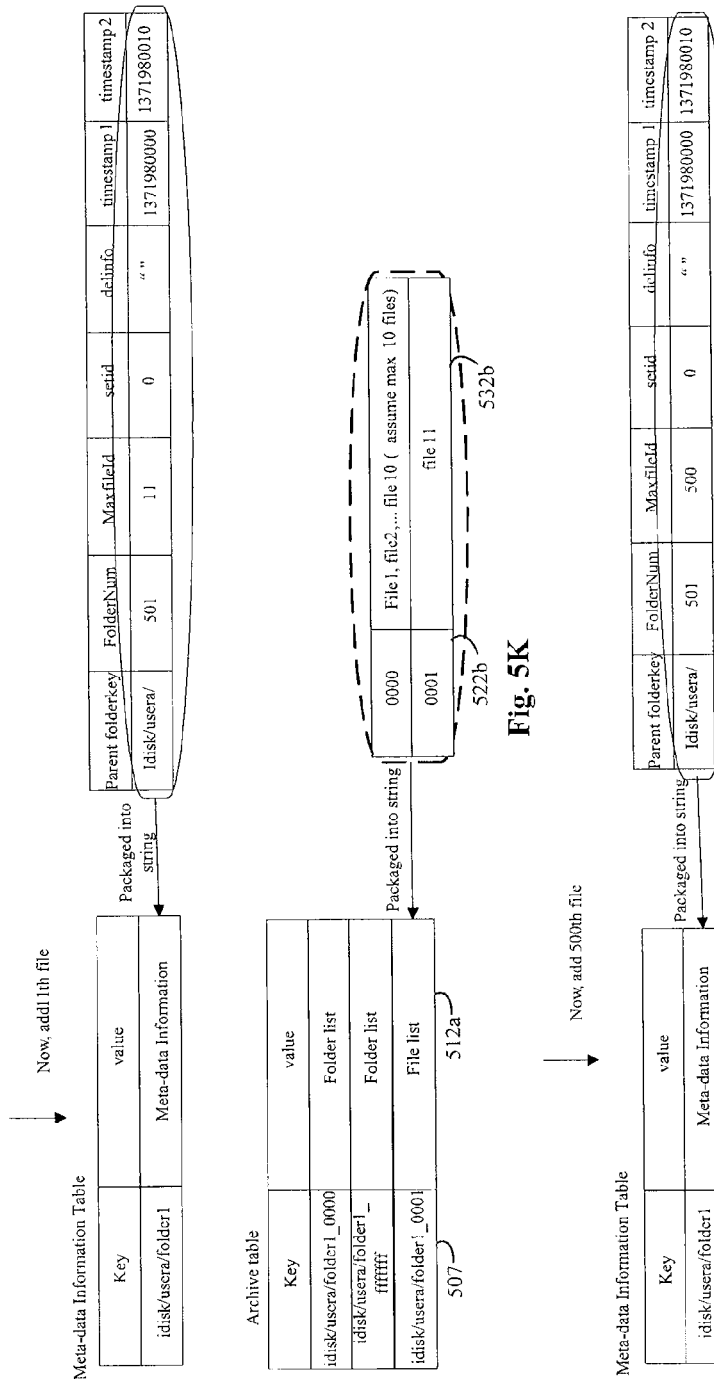
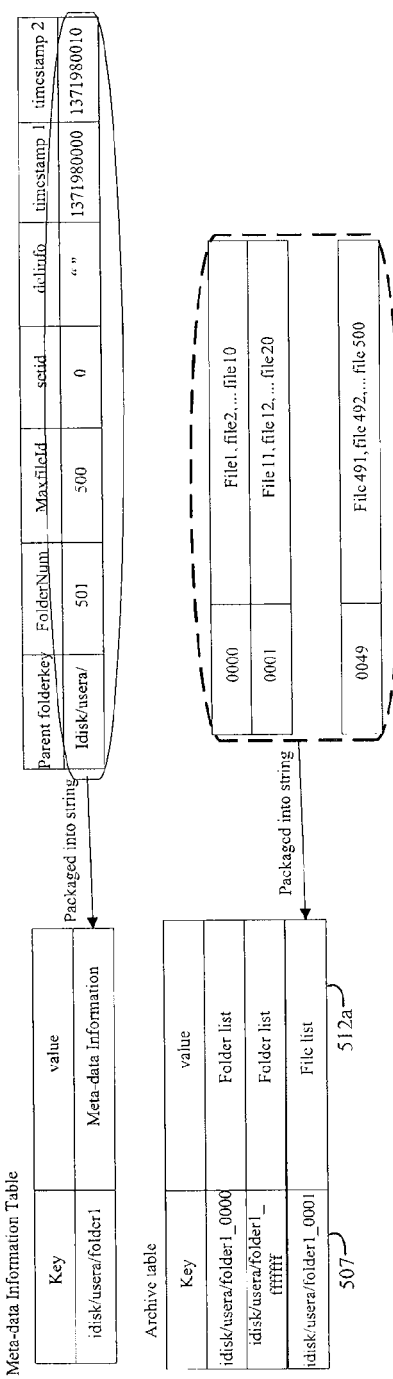
Fig. 5K
Fig. 5L

METHOD AND APPARATUS FOR FILE STORAGE

CROSS-REFERENCE TO RELATED APPLICATIONS

This application is a continuation of PCT Application No. PCT/CN2013/079084, filed on Jul. 9, 2013, which claims priority to Chinese Patent Application No. 2012102384276, filed on Jul. 10, 2012, both of which are hereby incorporated by reference in their entireties.

FIELD OF THE TECHNOLOGY

The present application relates to the field of computer data storage technologies and, more particularly, to a method and apparatus for file storage, file indexing and file management.

BACKGROUND

Conventional personal computer systems generally adopt a conventional tree-structure data storage mode or a "directory tree folder+file" structure for file storage. An example of such file storage structure implementation may be found in a Network File System (NFS), which an administrator configures a file to follow a hierarchy naming structure such as: drive\directory\parent folder\child folder\file. Such hierarchy arrangement sets up a way to index a file and makes possible file management.

For example, FIG. 1 illustrates an example of a prior art "directory tree folder+file" structure (10) of a storage system (11). The folders (12-14) at the top layer may be referred to as root directories, and the corresponding sub-folders (15-20) under the root directories may be referred to as sub-directories. Each of the corresponding sub-folders (15-20) is capable of storing more respective sub-folder lists (15a, 17a) and file lists (19a) (if no sub-folder exists under a root directory). Accordingly, the various folders (12-14), sub-folders (15-20), sub-folder lists (15a, 17a) and file lists (19a) form a recursive data structure or file index.

FIG. 2 illustrates the aforementioned conventional tree-structure data storage mode, which data is stored using key-value databases (50). For example, the key-value data base may be set up to have each folder (51-53) (i.e., directory) being stored as a Folderkey, and a "value" is designated to include a sub-folder list (51a, 52a) (i.e., sub-directory) and a file list (51b, 52b) which belong to their respective current folder (51, 52). The respective "value" of a storage record is represented by an elliptical ring (61, 62) which corresponds to the respective Folderkey of folders (51, 52) on the left.

Therefore, when the number of folders or files of a user have been increased, data access performance may encounter bottlenecking at the bottom layer, especially for existing network file systems, such as QQ album, social network sites, network drives such as Skydrive for cloud storage and other applications. Such bottlenecking is often caused by writing to or accessing a large amount of data which exceeds a threshold value supported by the storage system. In addition, in the existing data storage structures, data distribution is uncontrollable, and key-value databases are routed based on keys. Consequently, different folderkeys must be written to different network storage modules, and the network storage modules are allocated using fixed rules without considering data storage expansion and specific requirements.

SUMMARY

The present invention aims at providing a method and apparatus for file storage in order to improve data storage stability and accessibility, and to accomplish the objective of easing bottleneck by providing unlimited folder system directory tree storage.

The present invention provides a file storage method comprising the following steps:
 recording meta-data information generated for a folder, and storing the meta-data information of the folder into key-value databases; and,
 when the folder includes at least one sub-folder list and/or file list thereunder, storing contents of the at least one sub-folder list and/or file list into corresponding secondary keys based on the primary key.

Preferably, each of the corresponding secondary keys separately storing corresponding contents of the at least one sub-folder list and/or file list.

Preferably, the method further comprising:
 adding, deleting or renaming the at least one sub-folder list and/or file list included under the folder, in the corresponding secondary key under the folder.

Preferably, after the adding, deleting or renaming of the sub-folder list and/or file list in the corresponding secondary key under the parent folder, the method further comprising:
 updating the meta-data information in the primary key.

Preferably, prior to the recording of the meta-data information of the folder and storing of the meta-data information into the primary key, the method further comprising:
 generating the corresponding secondary keys based on the primary key.

Preferably, the meta-data information stored in the primary key comprises at least: the sub-folder number, current maximum file ID, current data set, file deletion information and timestamp of folders and files when written.

In an embodiment, the primary key may be stored at a primary memory module, and the secondary key may be stored at a secondary memory module within a storage apparatus. However, in another embodiment, only the primary key may be stored at a primary memory module since the secondary key may be directly generated from the primary key using the meta-data information.

The present invention also provides a file storage apparatus having at least a processor for processing file storage, which includes:
 a primary storage module which records meta-data information of a folder, and stores the meta-data information into key-value databases;
 a secondary storage module which stores contents of the at least one sub-folder list and/or file list included under the folder into corresponding secondary keys based on the primary key, when the folder includes at least one sub-folder list and/or file list thereunder.

Preferably, each of the corresponding secondary keys separately stores the corresponding contents of the at least one sub-folder list and/or file list.

Preferably, the apparatus further includes:
 a processing module for adding, deleting or renaming the sub-folder list and/or file list included in the corresponding secondary key under the folder; and
 an updating module for updating the meta-data information in the primary key.

Preferably, the apparatus further includes:
 a generation module for generating the secondary keys based on the primary key.

The file storage method and storage apparatus put forward by the present invention modify the conventional tree-structure data storage mode (i.e., "directory tree folder+file" structure) in such a way which writes the folder's meta-data information into a database using the primary key, and the folder lists and corresponding secondary keys are written with data of the sub-folder lists and file lists which are included under the folder.

The proposed method and apparatus improves processing efficiency of the conventional tree-structure data storage mode. In effect, the primary key is utilized to first encapsulate the meta-data information of the folder (i.e., at the root directory layer of the tree-structure). The primary key is stored in a primary memory module such as a first cache memory buffer, or into a key-value database as a meta-data information table (400) (see FIG. 4) which includes a generated value by packaging or writing the meta-data information into a string. To simply put, the folder's meta-data information is packaged or written into a string and stored into a key-value database. The key is the primary key which is generated based on a folder's name and based on the folder's path from the root directory. In this regard, the value is the packaged string.

Corresponding secondary keys are generated based on the primary key, and are stored in a secondary memory module as a second cache memory buffer, or into a second database as an archive table (500) (see FIG. 5A). The generation of secondary keys under the archive table data structure (see FIGS. 5A to 5P) provides an "open-ended" way to generate as many folders or files as needed by the storage system to accommodate a large data size.

In effect, "large data" exceeding a file size limit may be split up into multiple secondary keys for uniform distribution across the archive table. In this regard, storage stability may be enhanced through an expanded transaction operation, which "large data" may be accessed and processed through one corresponding secondary key at a time in the archive table. The use of "open-ended" secondary keys architecture to overflow "large data" by generating additional folders or files as needed solves the problem of "bottlenecking" in processing, regardless of threshold value set by the storage system. In addition, the "open-ended" secondary keys architecture also enables "unlimited" data size accommodation, which may find many attractive applications to network photo sharing.

The same primary key/secondary key file storage architecture may be established for each folder in a subsequent layer following the tree-structure data storage mode hierarchy, by simply generating a new primary key for the folder as a parent folder and recursively generating corresponding secondary keys according to the newly generated primary key, respectively.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims.

FIG. 5E illustrates an updating of the data storage structure of the primary key, when another child folder is added to a first sub-folder in the first sub-folder list, according to an aspect of the present invention.

FIG. 5F illustrates an updating of the data storage structure of the primary key, when a first sub-folder in the first sub-folder list reaches a maximum child folder limit set for the sub-folder, according to an aspect of the present invention.

FIG. 5I illustrates an updating of the data storage structure of the primary key, when a second secondary key and a first sub-folder is added to accommodate data overflow or an addition of another child folder, according to an aspect of the present invention.

FIG. 5J illustrates an updating of the data storage structure of the primary key, when a first file list is added to accommodate a first file, according to an aspect of the present invention.

FIG. 5K illustrates an updating of the data storage structure of the primary key, when a second file is added to the first file list, according to an aspect of the present invention.

FIG. 5L illustrates an updating of the data storage structure of the primary key, when the first file list has reached a maximum file limit set for the file list, according to an aspect of the present invention.

DETAILED DESCRIPTION OF THE EMBODIMENTS

The various embodiments of the present invention provide a technical scheme as follows: a unique primary key, and the meta-data information of a folder is stored using a primary key and multiple sub-folder lists and file lists under the same folder are stored using a plurality of corresponding secondary keys. To simply put, both the primary key and the secondary key belong to the same folder, and the use of secondary key enables "open ended" or unlimited expansion of data and to avoid processing bottlenecks related to underlying data storage in case data are accumulated and become large.

Figure 1:
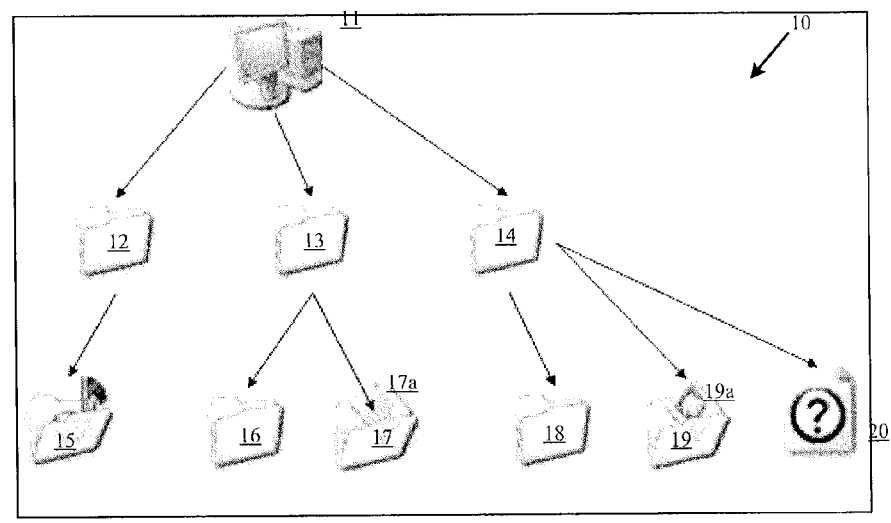
FIG. 1 illustrates a prior art directory tree data storage structure.
Figure 2:
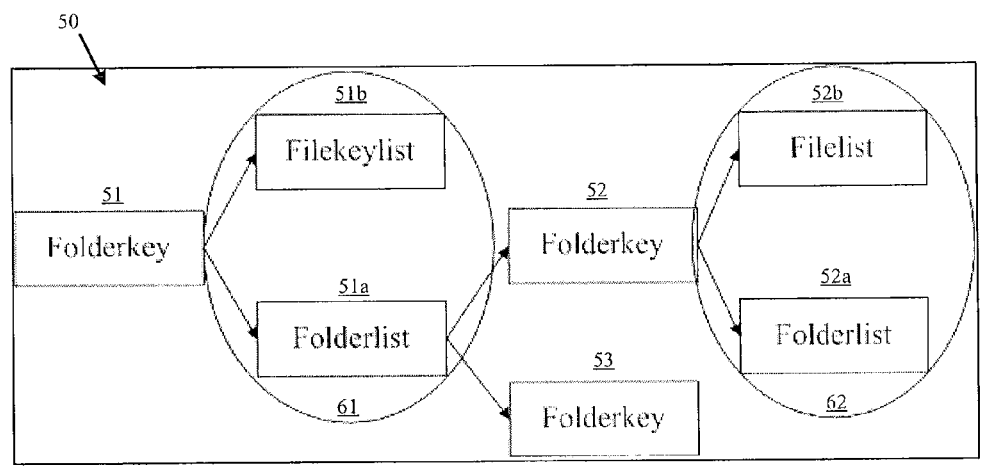
FIG. 2 illustrates a prior art storage relationship in the data storage structure shown in FIG. 1.
Figure 3A:
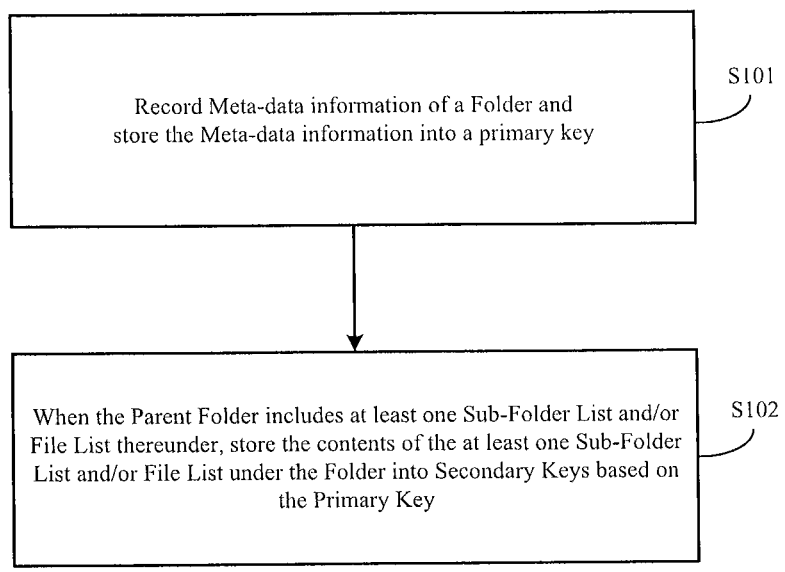
FIG. 3A is an exemplary flow diagram of a first embodiment of the file storage method according to an aspect of the present invention.

FIG. 3A is an exemplary flow diagram of a first embodiment of the file storage method according to an aspect of the present invention. As shown in FIG. 3, the present invention puts forward a file storage method including at least the steps of:

Step S101—Record meta-data information of a folder and store the meta-data information into a database, using the primary key; and Step S102—When the folder includes at least one sub-folder list and/or file list thereunder, store the contents of the at least one sub-folder list and/or file list included under the parent folder into secondary keys based on the primary key.

This embodiment may be implemented on existing directory tree data storage structures by modifying the conventional processing method, the data of a folder (including sub-folder lists and file lists) may be stored in this manner: the folder's name is used as a primary key, which stores the meta-data information of the folder. The sub-folder lists and file lists of the folder may be written to a plurality of corresponding secondary keys, so as to accomplish the objective of "open ended" or unlimited folder expansion system in tree-directory folder and file storage. The aforesaid folder may be the root directory in the directory tree structure.

This embodiment assumes that the folder in which the parent directory is located is a parent folder and the various sub-folder lists and file lists under the parent directory are sub-folder lists and file lists. Each folder is an element of master data having unique characteristics, each folder has a corresponding primary key, and the sub-folder lists and file lists are stored in secondary keys based on the primary key.

The folder may or may not have data thereunder, i.e. the folder may include at least one sub-folder list and/or file list, or may be an empty folder without any folder list or file list. If the folder is an empty folder, then only its meta-data information will be written to a database using the primary key.

Figure 3B:
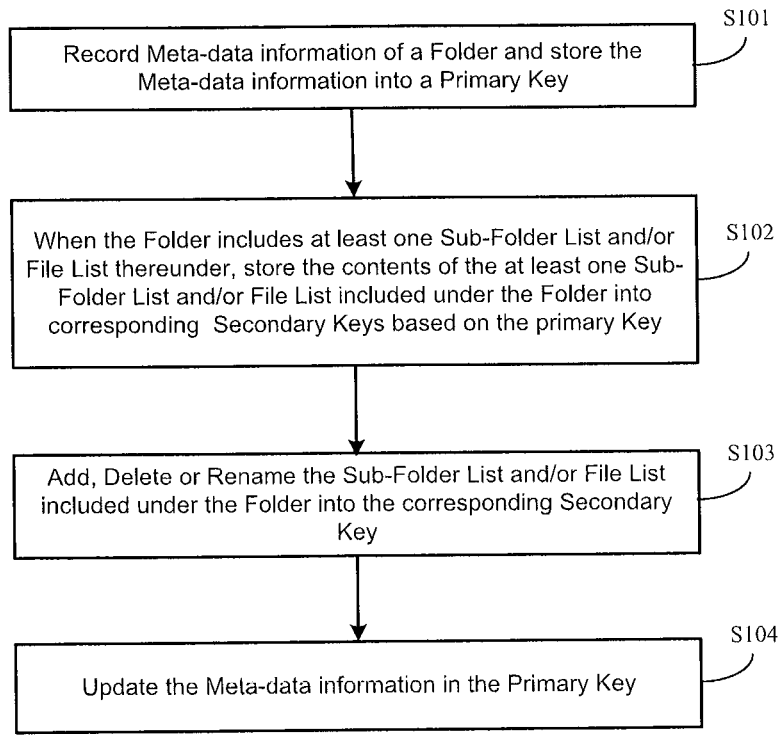
FIG. 3B is a flow diagram illustrating an addition, deletion or renaming operation of the sub-folder list and/or file list, according to a second embodiment of the present invention.

FIG. 3B is a flow diagram illustrating an addition, deletion or renaming operation of the sub-folder list and/or file list, according to a second embodiment of the present invention. FIG. 3B illustrates several exemplary operations following step S102 of FIG. 3A. The method further includes:

Step S103—Add, delete or rename the sub-folder list and/or file list included under the folder, in the corresponding secondary key.

Step S104—Update the meta-data information in the primary key.

The second embodiment and the first embodiment differ by the adding, deleting or renaming operations for subsequent folder contents.

Specifically, if addition, deletion or renaming of folders or files is required during processing of subsequent files, the following operating mode may be adopted.

Processing of Folders: If it is required to create a new sub-folder, then the contents of the sub-folder are stored in the corresponding secondary key of the folder, and the meta-data information of the primary key of the folder is updated at the same time. When required, a corresponding secondary key is newly generated. The contents of the sub-folder are stored into the corresponding secondary key, while the meta-data information of the primary key of the folder is updated at the same time.

If it is required to delete a sub-folder, all information of the sub-folder will also be deleted. Accordingly, the meta-data information of the primary key of the folder will be updated at the same time.

If it is required to rename a sub-folder, then all contents of the original sub-folder is read, and a new sub-folder is used for writing a set of data such that the data is written to a secondary key of the new sub-folder, and the data stored in the secondary key of the original sub-folder is subsequently deleted.

Processing of Files: If it is required to add a file, the attribute of the folder is modified, an element of data is written into databases using a secondary key, the file name is stored and the meta-data information of the folder will be updated at the same time. If it is required to delete a file, then certain data in archive table may be directly deleted, and the meta-data information of the folder may be updated. If it is required to rename a file, then certain data in archive table may be updated, and the meta-data information of the folder may be updated.

This embodiment not only achieves "open ended" unlimited expansion of data, but also avoids the bottlenecks from the underlying data storage when data are accumulated and becoming large, so as to accomplish the objective of unlimited directory tree storage. Also, the embodiment stores large data by splitting it into multiple keys, achieving uniform distribution of data, providing greater convenience in reading and writing operations, and thereby enhancing storage stability of storage system databases and facilitating data expansion and systems' transaction operations.

Figure 3C:
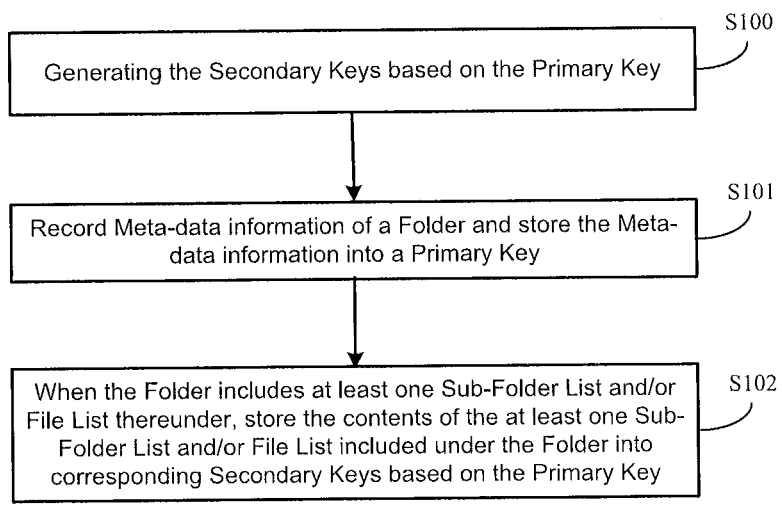
FIG. 3C is a flow diagram illustrating generation of secondary keys based on the primary key, according to a third embodiment of the file storage method of the present invention.

FIG. 3C is a flow diagram illustrating generation of secondary keys based on the primary key, according to a third embodiment of the file storage method of the present invention. More specifically, prior to the step S101 of "recording meta-data information of a folder and storing the meta-data information in a primary key", the method further includes:

Step S100—Generating the secondary keys based on the primary key.

The third embodiment and the first embodiment differ by disclosing the process of generating corresponding secondary keys. More specifically, the secondary keys are generated from the primary key, by adding a numerical suffix to it so that the corresponding secondary keys can be associated with the primary key. The objective of "open ended" unlimited folder system directory tree storage is accomplished by achieving enhancing data storage expansibility. It should be noted that the second embodiment and the third embodiment may be implemented in combination.

Figure 4:
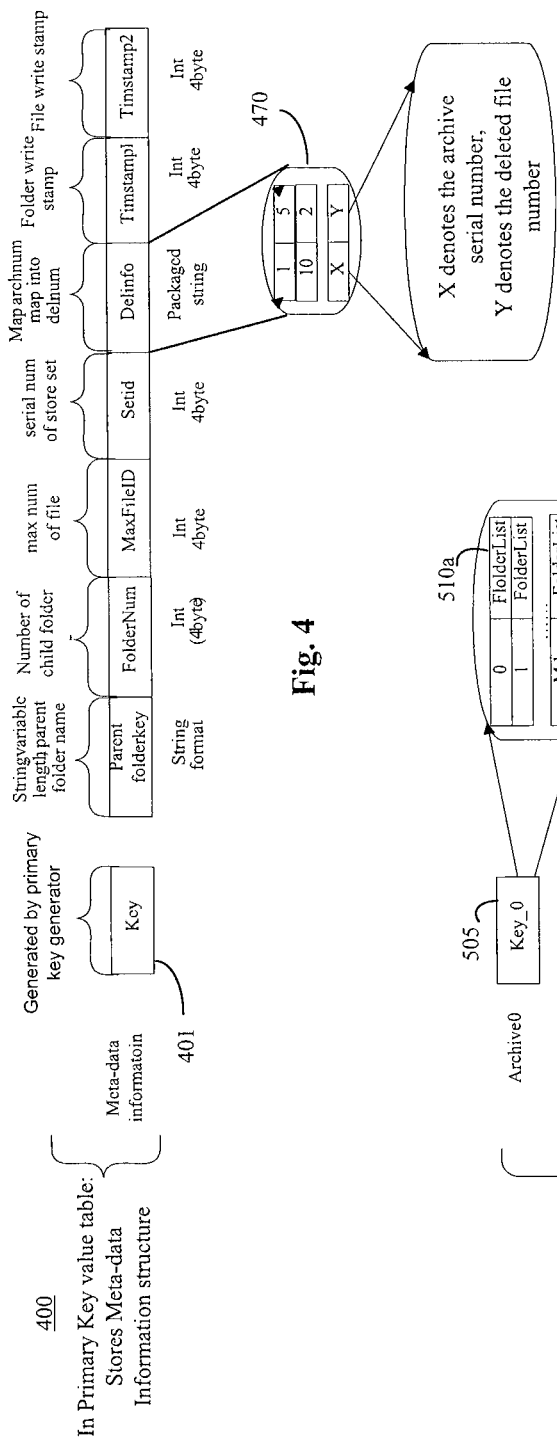
FIG. 4 illustrates a meta-data information table, where meta-data information is generated and stored into a database using the primary key, according to an aspect of the present invention.

FIG. 4 illustrates a meta-data information table, where meta-data information is generated and stored into a key-value database using the primary key, according to an aspect of the present invention. As shown in FIG. 4, the structure of meta-data information is stored into a key-value database (400), also named as "meta-data-information-table". The meta-data information table is a database of the Key (401) (which is a primary key) having a packaged string with values calculated from the Parentkey, FolderNum, MaxFileID, Setid, Delinfo, TimeStamp1 and TimeStamp2.

Below is a definition of each term in the meta-data information table:

Key (401) represents the primary key of the folder, and the primary key is the core data structure of the entire file system which is used for identifying the folder. In the entire system, the primary key is unique and all corresponding secondary keys are associated with the primary key while the various corresponding secondary keys are mutually independent. Hence the primary key does not overlap with the corresponding secondary keys of the entire system.

Parentkey represents the primary key of its parent folder.

FolderNum represents the current number of sub-folders or child folders in the same layer (i.e., child folder1, child folder 2, . . . child folder n etc.) As the number of child folder increases, the FolderNum also increases until the number reaches a maximum. Beyond the maximum, a new secondary key would be generated to start a newly created sub-folder list, such that a large amount of data from a current sub-folder lists may be divided (or overflows) into another separate sub-folder list to be stored in the archive table, thus accomplishing the objective of an "open ended" unlimited storage of sub-folder contents.

MaxFileID represents the current maximum file ID (identifier).

Setid is the set in which currently stored data is located. For example, data of sub-folder lists and files may be written into different sets based on a Setid. In network file systems, a number of machines may form a cluster and such a cluster may be referred to as a set. In large-size storage structures, a set is usually a management unit including functions such as expansion, transfer, staging, destaging, etc. To simply put, a set is a group of machines (usually 10-30 pieces or more), and this group of machines are provided with modules as required by a storage system for the completion of various tasks, such as accessing modules, logic processing modules, database modules, etc. Therefore, each set may be separately operated in a storage system and is logically identified with a Setid.

DelInfo indicates the deleted file information only. DelInfo does not record folder deletion information.

TimeStamp1 and TimeStamp2 record the times of the most recently written sub-folder and file, respectively.

Each of the corresponding secondary keys separately stores contents of the corresponding sub-folder list and/or file list. The corresponding secondary keys are generated based on the primary key, by modifying or adding a numeral suffix. The secondary keys may also be generated in other modes.

Figure 5A:
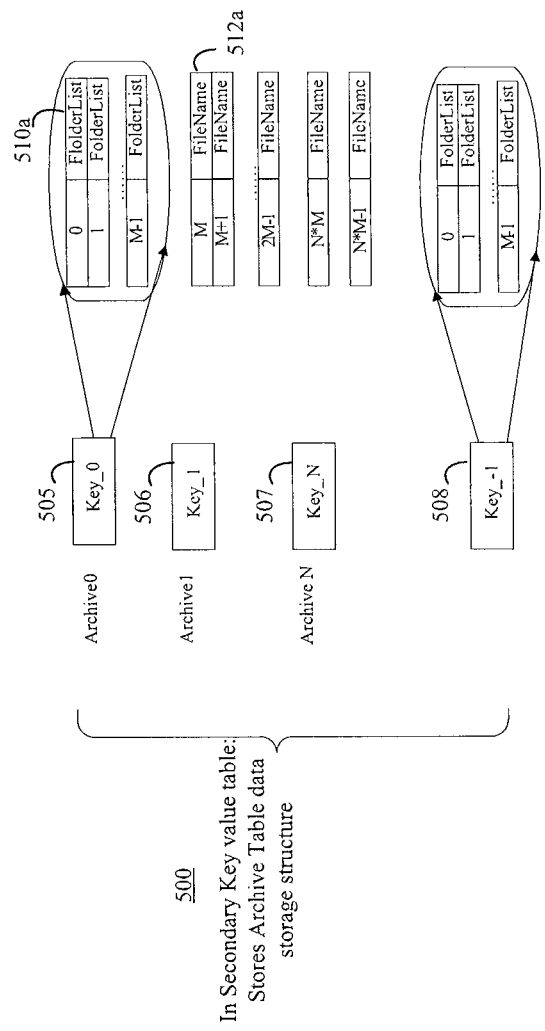
FIG. 5A illustrates an archive table, which secondary keys are generated based on the primary key, according to an aspect of the present invention.

FIG. 5A illustrates an archive table, which secondary keys are generated based on the primary key, according to an aspect of the present invention, where a primary key (401) (see FIG. 4) is constituted with its corresponding secondary keys (505-508).

In the data storage structure, the primary key (401) records and stores meta-data information of the folder, and the multiple secondary keys (505-508) thereunder for separately recording the various sub-folder lists (510*a*) and file lists (512*a*) under the folder; each of the secondary keys (505-508) is capable of storing multiple sub-folder lists (510*a*) and/or file lists.

Multiple secondary keys (505-508) may be numbered respectively in the order of Archive 0-N, and if a folder list is too large they may be stored in Archive-1, -2, . . . etc, in which case the Foldernum in the meta-data information is of vital importance when a folder list (510*a*) is pulled. As mentioned above, FolderNum is the current total quantity of sub-folders and is used for processing logics stored by sub-folder lists when the quantity of such sub-folders increases. In case if the quantity of sub-folder lists (510*a*) is so large that the sub-folder lists cannot be stored in a data archive, then the secondary keys in which they are located can be computed based on the second FolderNum.

When the number of sub-folders increases, then the FolderNum value is changed to FolderNum plus 1. When a sub-folder is deleted, the value of FolderNum is however, unchanged. The functions of FolderNum are to compute according to certain logic the secondary keys by which the data of sub-folders is stored, and to pull sub-folder lists according to these secondary keys (505-508). The number of data elements of each data archive is fixed and remains unchanged subsequently, but is configured during system initialization.

It may be seen from the meta-data information table (400) has a corresponding Key (401) (i.e., primary key) and the folder lists (510*a*) and file lists (512*a*) thereof are stored by secondary keys (505-508), the data storage of each folder and file is relatively independent so that the folders may be generated recursively, achieving unlimited expansion of data storage. In this regard, bottlenecks related to large data processing in the data storage can be avoided thus achieving the objective of an "open ended" unlimited folder system directory tree storage.

This "open ended" unlimited folder system directory tree storage is especially useful towards network file systems, such as to picture storage of QQ space album which a user may create many albums with many photos, which albums may correspond to folders, and photos may correspond to files. Therefore, adopting the "open ended" unlimited file directory storage scheme would meet the storage requirement of users by creating numerous albums with thousands of photos in each album. Such file structure and storage scheme may be used in other applications such as the Sky-Drive in cloud storage and other applications.

In addition, the "open ended" unlimited file directory storage scheme improves the scalability of the data system, is capable of balancing the size of data and dividing large data into multiple secondary keys for storage such that large data could be uniformly distributed. In this regard, storage databases could have better storage performance and having enhanced storage stability. The expansion of the data storage structure and the introduction of Setid concept improves data expansibility and long-term stability of system operation, thus providing greater ease of data reading and writing operations.

It should be noted that this data storage expansion with multiple sub-folder lists and/or file lists may further be implemented under each sub-folder as a lower layer to create corresponding secondary keys for storing data.

Exemplary operations of the various embodiments of the invention may be illustrated by FIGS. 5B to 5N below.

Figure 5B:
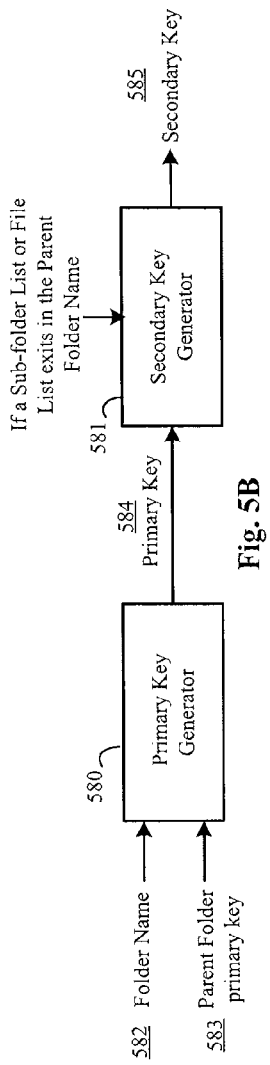
FIG. 5B illustrates an exemplary method to generate a primary key and a corresponding secondary key, according to an aspect of the present invention.

FIG. 5B illustrates an exemplary method to generate a primary key and a corresponding secondary key, according to an aspect of the present invention. The invention may be deployed in an exemplary server, having hardware configuration of a x86_64 GNU/Linux operating system, an Intel® Xeon® CPU E5645 @ 2.40 GHz 512M. Two data tables, namely, a meta-data information table (500*a*) and an archive table (500*b*) may be deployed in separate memory locations. Both tables may be empty with without any stored data records.

Assume we provide a net disk service called "idisk", the net disk service root directory may be named "idisk/". UserA's root directory may be named "idisk/usera/". In this regard, Usera_folder's parent folder name (583) may be named "idisk/usera/". A folder named "folder1" may be created. The primary key (584) "idisk/usera/folder1" may be generated using a primary key generator (580) by adding the parent folder name (583) "idisk/usera/" to the created folder name (582) "folder1" to form "idisk/usera/folder1" as the primary key. For example: parent folder name ("idisk/usera/")+folder name ("folder1")="idisk/usera/folder1".

Likewise, if a sub-folder list (510*a*) or file list (512*a*) (see FIG. 5C) exists in the parent folder name "idisk/usera/folder1", a corresponding secondary key (585) may be generated by a second key generator (581) (the same key generator (580) may be used)

Figure 5C:
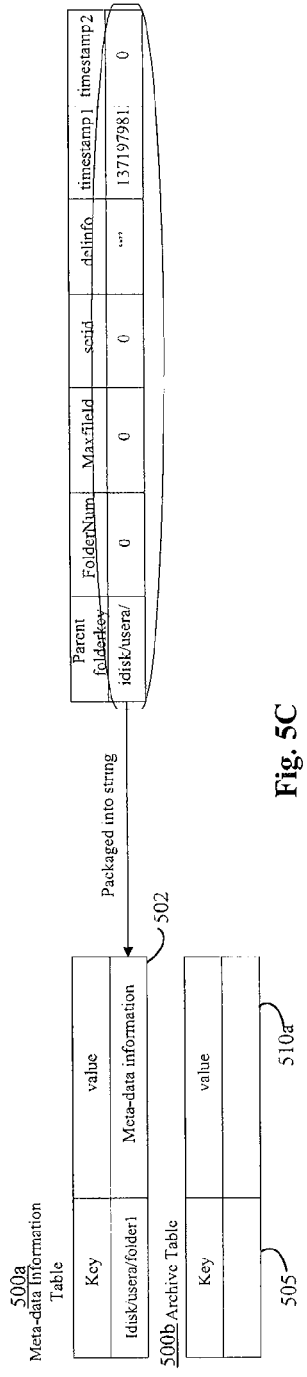
FIG. 5C illustrates an exemplary data storage structure of a primary key, which is first generated from meta-data information when the sub-folder list is still empty, according to an aspect of the present invention.

FIG. 5C illustrates an exemplary data storage structure of a primary key, which is first generated from meta-data information when the sub-folder list is still empty, according to an aspect of the present invention.

FIG. 5C illustrates that if there is no child folder (i.e., FolderNum=0) in the parent folder idisk/usera/, the primary key (584) would simply be just "idisk/usera/". Accordingly, the Maxfileid is zero, the Setid is default to zero. Since no file is deleted in the folder, the delinfo should be a null string " " format. The folder modify timestamp is the current time stamp, generated by the system api time or by the unix operation system. No file created folder as "usera_folder", so the file modify timestamp is zero by default. Because there is no child-folder or child-file in usera_folder, the folder list (510*a*) would be empty and no secondary key (505) is generated in the archive table (500*b*).

Figure 5D:
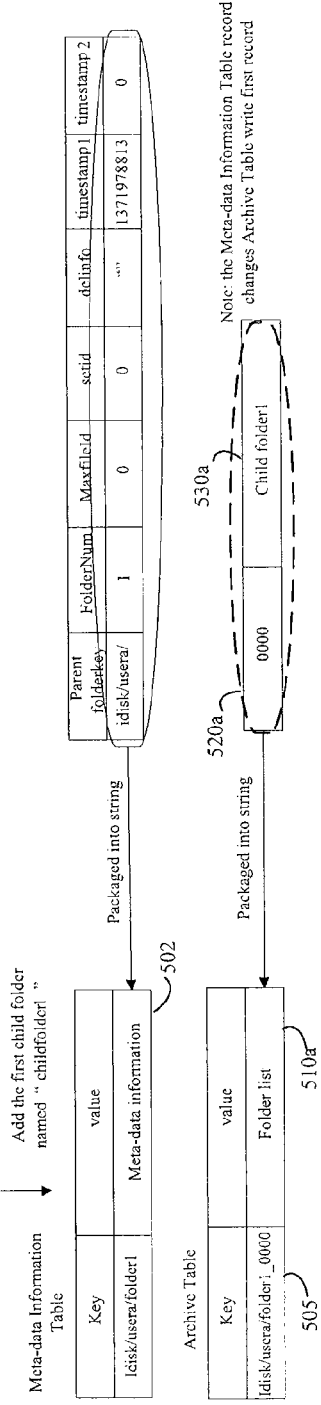
FIG. 5D illustrates an updating of the data storage structure of the primary key, which is caused by a generation of a corresponding secondary key when a child folder is added to a first sub-folder list, according to an aspect of the present invention.

FIG. 5D illustrates an updating of the data storage structure of the primary key, which is caused by a generation of a corresponding secondary key when a child folder (530*a*) is added to a first sub-folder list, according to an aspect of the present invention.

FIG. 5D shows that one folder named folder1, has been created. Therefore, the meta-data information is updated in the meta-data information table 500*a*. The archive table (505) has two columns, a "Key" column for the generated secondary key, and a "value" column for a generated value for the folder list (510*a*) or file list (512*a*).

The secondary key (505) is generated by a key generator (581), which may be a program module running in memory. In this example, the primary key is "idisk/usera/folder1", and the secondary key is "idisk/usera/folder1_0000". Note that the timestamp1 records a writing time when the new child folder (child folder1) has been added. The appendix "0000" is an integer number (520*a*) "int" in hex decimal having 4 bytes in memory.

If there is exists more files in folder1 (such as exceeds 256), the secondary key's appendix in decimal format may be idisk/usera/folder1_256, but 256 is a decimal number. The decimal number may be transformed to binary format, then append to the primary key, spanned with the char "_". Since the hex decimal format of 256 is 0100, therefore, the secondary key in memory would be "idisk/usera/folder1_0010".

FIG. 5E illustrates an updating of the data storage structure of the primary key, when another child folder (child folder2) is added to a first sub-folder in the first sub-folder list (510*a*), according to an aspect of the present invention. Note that the timestamp1 records another writing time when the new child folder (child folder2) has been added.

FIG. 5F illustrates an updating of the data storage structure of the primary key, when a first sub-folder in the first sub-folder list reaches a maximum child folder limit set for the sub-folder, according to an aspect of the present invention. In a storage system, the archive table (500*b*0 may define a constant value which limits the max length of the archive record. For the ease of illustration, let's assume the constant is 10. In this regard, up to ten child folders may be stored in the first sub-folder (0000), as shown in FIG. 5F.

Figure 5G:
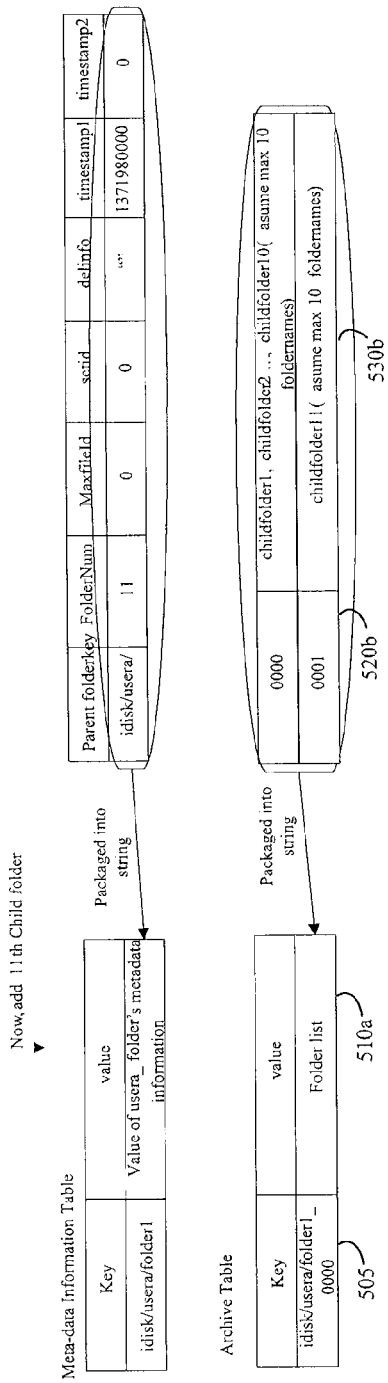
FIG. 5G illustrates an updating of the data storage structure of the primary key, when a second sub-folder in the first sub-folder list is added to accommodate data overflow or an addition of another child folder, according to an aspect of the present invention.

FIG. 5G illustrates an updating of the data storage structure of the primary key, when a second sub-folder (520*b*) in the first sub-folder list (510*a*) is added to accommodate data overflow or an addition of another child folder (child folder11), according to an aspect of the present invention. The addition of the child folder 11 has created a second 0001 sub-folder (520*b*), which accordingly updates the meta-data information. Note that the timestamp1 records another writing time when the new child folder (child folder11) has been added.

Figure 5H:
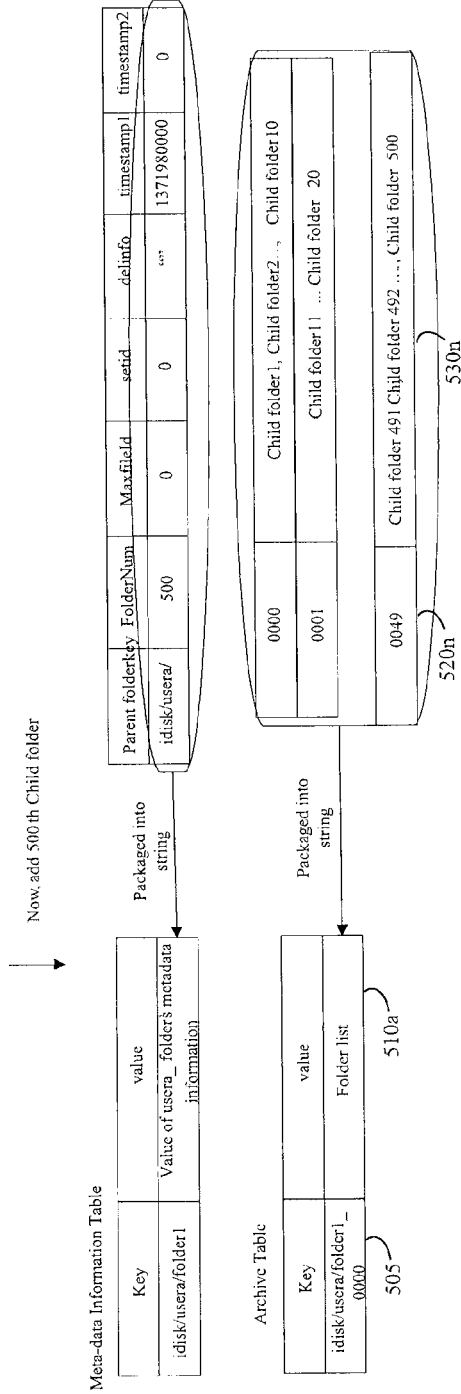
FIG. 5H illustrates an updating of the data storage structure of the primary key, when a maximum child folder limit set for the sub-folder list has been reached, according to an aspect of the present invention.

FIG. 5H illustrates an updating of the data storage structure of the primary key, when a maximum child folder limit (i.e., child folder 500) set for the sub-folder list (510*a*) has been reached, according to an aspect of the present invention.

FIG. 5I illustrates an updating of the data storage structure of the primary key, when a second secondary key (506) and a first sub-folder (521*a*) is added to accommodate data overflow or an addition of another child folder (child folder 501), according to an aspect of the present invention. Until now, two parameters have been discussed, one is 10 (max number of child folder), another is 50 (maximum archive rows). The archive serial number may be increased "open end" accordingly as -0, -1, -2, -3, . . . without a limit.

FIG. 5J illustrates an updating of the data storage structure of the primary key, when a first file list (512*a*) is added to accommodate a first file (532*a*), according to an aspect of the present invention. The archive key or secondary key is generated as "idisk/usera/folder1_0001", where the serial number start from 1, increasing 1 each time, where the folder serial number begin with 0, reducing 1 each time. As seen, the meta-data information "MaxfileId" fileId has been changed to 1. Note that the timestamp2 records another writing time when the new file (532*a*) has been added.

FIG. 5K illustrates an updating of the data storage structure of the primary key, when another file (i.e., file 11 (532*b*)) is added to generate a second row 0001 of file value (522*b*), according to an aspect of the present invention.

FIG. 5L illustrates an updating of the data storage structure of the primary key, when the first file list has reached a maximum file limit (file 500) set for the file list (512*a*), according to an aspect of the present invention.

Figure 5M:
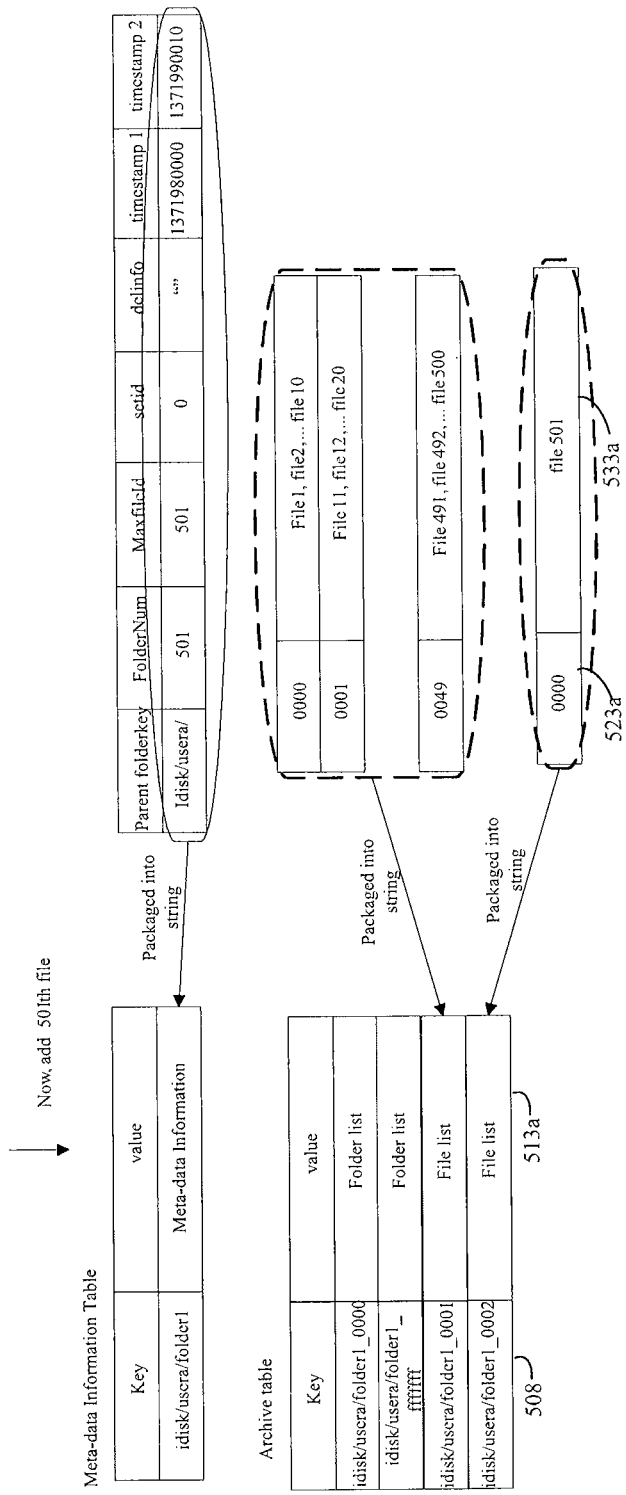
FIG. 5M illustrates an updating of the data storage structure of the primary key, when a second file list is added to accommodate a data overflow or an addition of another file, according to an aspect of the present invention.

FIG. 5M illustrates an updating of the data storage structure of the primary key, when a second file list (513*a*) is added to accommodate a data overflow or an addition of another file (file 501 (533*a*)), according to an aspect of the present invention. Note that a new corresponding secondary key (508) has been generated as a result of such overflow of files, or splitting of a large file into more secondary key for transaction.

Figure 5N:
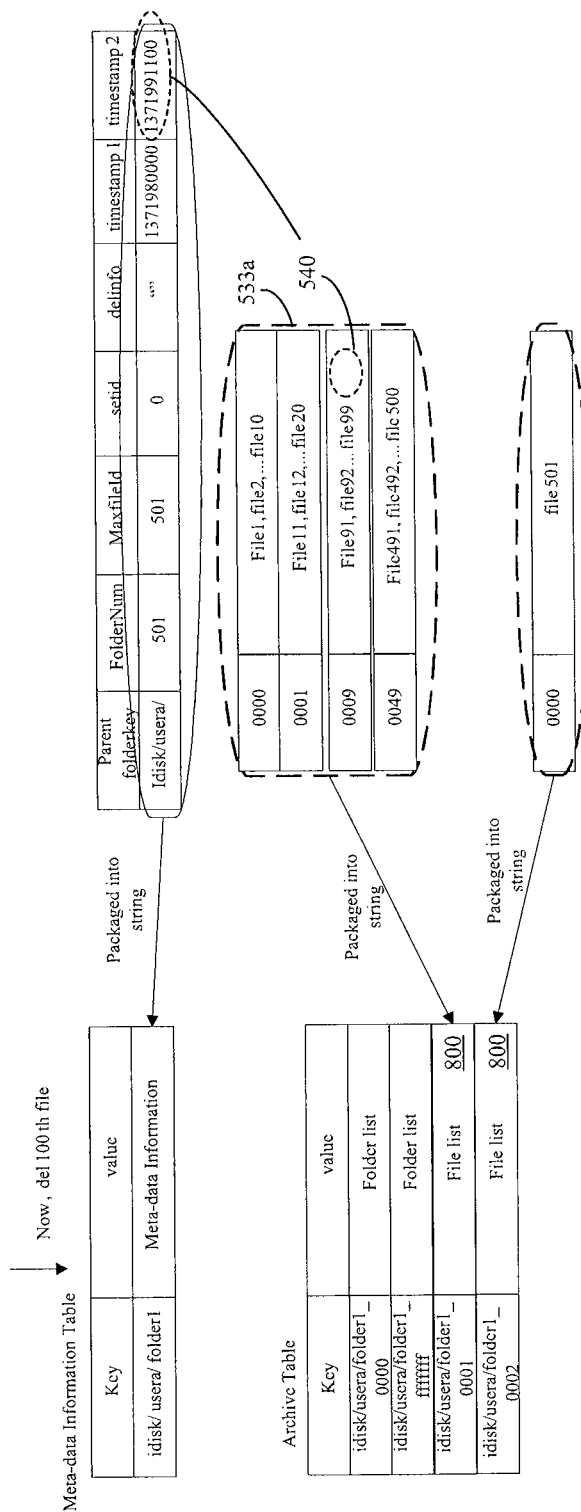
FIG. 5N illustrates an updating of the data storage structure of the primary key, when a file in the first file list has been deleted, according to an aspect of the present invention.

FIG. 5N illustrates an updating of the data storage structure of the primary key, when a file (file 100 (540)) in the first file list of file row 0009 has been deleted, according to an aspect of the present invention. Note that the timestamp2 records another writing time when file 100 (540) has been deleted.

Figure 6:
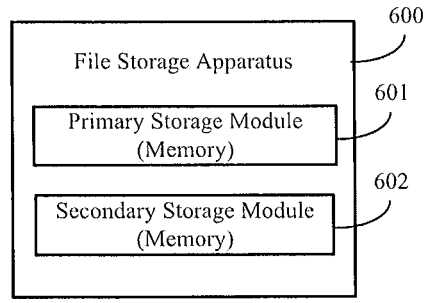
FIG. 6 is an exemplary block diagram illustrating file storage apparatus according to the first embodiment of the present invention.

FIG. 6 is an exemplary block diagram illustrating file storage apparatus according to the first embodiment of the present invention. As shown in FIG. 6, a first embodiment of the present invention puts forward a file storage apparatus (600) includes: a primary storage module (601) and a secondary storage module (602), wherein:

the primary storage module (601) is for recording meta-data information of a parent folder and storing the meta-data information in a primary key (584); and the secondary storage module (602) is for storing the contents of the at least one sub-folder list (510a) and/or file list (512a) included under the parent folder (idisk/user/) (583) in secondary keys (585) based on the primary key (584) when the parent folder includes at least one sub-folder list (510a) and/or file list (512a) thereunder.

The aforesaid parent directory may be a root directory in a directory tree structure. Specifically, meta-data information of a folder is recorded and stored in a primary key (584) by the primary storage module (601) (RAM or DRAM); the contents of sub-folder lists and/or file lists included under the folder are stored in secondary keys (585) based on the primary key (584) by the secondary storage module (602) (RAM or DRAM).

Figure 7:
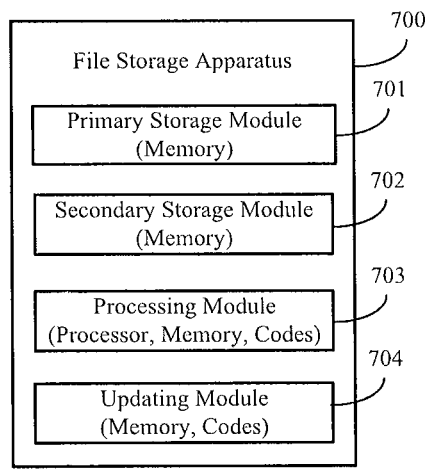
FIG. 7 is an exemplary block diagram illustrating file storage apparatus according to the second embodiment of the present invention.

FIG. 7 is an exemplary block diagram illustrating file storage apparatus according to the second embodiment of the present invention. The second embodiment of the present invention puts forward a file storage apparatus (700) based on the first embodiment, wherein the apparatus further includes:

a processing module (703) (may be a CPU, or processor executing codes in a RAM) for adding, deleting or renaming the sub-folder list and/or file list included under the parent folder, in the corresponding secondary key; and an updating module (704) (may be the same CPU executing codes in a RAM) for updating the meta-data information in the primary key.

The second embodiment and the first embodiment differs in that the second embodiment further comprises adding, deleting or renaming operations for subsequent folder contents.

Specifically, if addition, deletion or renaming of folders or files is required during processing of subsequent files, the following operating mode may be adopted.

Processing of Folders:

If it is required to create a new sub-folder (i.e., a child folder), then the processing module (703) stores the contents of the sub-folder in the corresponding secondary key in the parent folder, and the meta-data information of the folder is updated at the same time; or if required, a secondary key may be added into the archive table. The contents of the sub-folder may be stored in the secondary key, and the meta-data information of the folder may be updated by the updating module (704) at the same time.

If it is necessary to delete a sub-folder in a folder, the processing module (703) may update the information of folder and delete all information within the sub-folder while the meta-data information of the folder may be updated by the updating module (804) at the same time.

If it is required to rename a sub-folder, then the processing module (703) reads all contents of the original sub-folder, uses a new sub-folder for writing a set of data, writes the data to a secondary key of the new sub-folder, and deletes the data stored in the secondary key of the original sub-folder. The meta-data information of the folder is updated by the updating module 804 at the same time.

Processing of Files:

For adding a file, the processing module (703) updates or modifies the attribute of the folder, writes an element of data in a secondary key the folder, and stores the file name. The meta-data information of the folder is updated or modified by the updating module (704) at the same time.

For deleting a file, the processing module (703) directly deletes certain data in a secondary key of the folder. The meta-data information of the folder is updated or modified by the updating module (704).

For renaming a file, the processing module (803) directly amends certain data in a secondary key of the folder. The meta-data information of the folder is amended by the updating module (704).

This embodiment not only achieves "open ended" unlimited expansion of data but also avoids bottlenecks related to underlying data storage when data are accumulated and become large, so as to accomplish the objective of unlimited folder system directory tree storage. Also, the embodiment stores big data by splitting it into multiple secondary keys for uniform distribution of data and greater convenience in reading and writing operations, and thereby enhancing storage stability of system databases and facilitating data expansion and systems' transaction operations.

Figure 8:
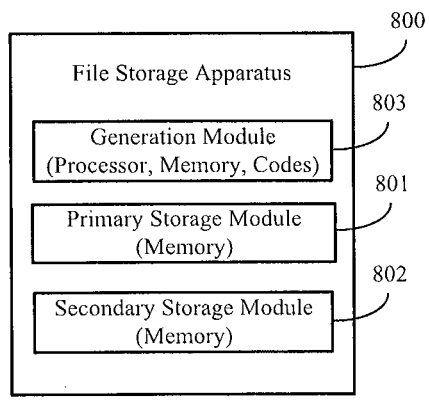
FIG. 8 is an exemplary block diagram illustrating file storage apparatus according to the third embodiment of the present invention.

FIG. 8 is an exemplary block diagram illustrating file storage apparatus according to the third embodiment of the present invention. As shown in FIG. 8, a third embodiment of the present invention puts forward a file storage apparatus based on the first embodiment, wherein the apparatus further includes:

a generation module (800) for generating the secondary keys (585) based on the primary (584).

The third embodiment and the first embodiment differ by including the process of generating secondary keys (585). Specifically, the generation module (800) generates the secondary keys in the mode of primary key+numeral so that the secondary keys are associated with the primary key, the objective of unlimited folder system directory tree storage is accomplished, and data storage expansibility is enhanced. It must be noted that the second embodiment and the third embodiment may be implemented in combination.

The file storage method and apparatus put forward by the present invention alters the existing directory tree data storage mode in such a way that a folder uses a primary key to write a meta-data information and the sub-folder lists and file lists thereof use secondary keys to write data, thereby achieving "open ended" unlimited expansion of data and avoiding bottlenecks related to underlying data storage when data are accumulated and become big, so as to accomplish the objective of unlimited folder system directory tree storage. In comparison with the prior art, the present invention stores big data by splitting it into multiple keys for uniform distribution of data, and thereby enhancing storage stability of system databases and facilitating data expansion and systems' transaction operations.

The foregoing relates to preferred embodiments of the present invention and shall not be construed as limiting the scope of the invention. Any equivalent structures or process transformations made using the contents of this prospectus and the accompanying drawings, or direct or indirect use of those contents in other related technical fields shall fall within the scope of patent protection of the present invention.

All or part of the operations described above in the embodiments may be implemented via instruction code/program operable to cause relevant hardware to perform the operations, and the program may be stored in a non-transitory computer readable storage medium, such as a ROM/RAM, a magnetic disk, or an optical disk, which are executed in a machine, such as in a computer, a laptop, a server, or cloud computing infrastructure. For example, the invention may be implemented as an algorithm as codes stored in a program module or a system with multi-program-modules. The bin program run in servers like x86_64 unix platform, or x86 unix/Linux servers It will be apparent to those skilled in the art that various modifications and variations can be made to the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for file storage, comprising:
    recording meta-data information generated for a folder, and storing the meta-data information of the folder into key-value databases, wherein the key-value comprises at least a primary key with a first key value and a secondary key with a second key value; and wherein:
        the primary key designates at least: a drive location, a user name and a parent folder name of the folder, and the first key value comprises metadata information of the primary key in string format,
        the secondary key comprises the drive location, the user name and the parent folder name of, and a first child folder name, and the second key value comprises metadata information of the secondary key in string format, wherein the first child folder comprises at least: one subfolder list and/or file list thereunder, wherein contents of the at least one subfolder list and/or file list are stored into a corresponding location under the secondary key and according to the secondary key value.

2. The method according to claim 1, wherein each of the corresponding secondary keys separately stores corresponding contents of the at least one subfolder list and/or file list.

3. The method according to claim 1, comprising:
    adding, deleting or renaming the at least one subfolder list and/or file list in the corresponding secondary key under the folder.

4. The method according to claim 3, wherein the adding, deleting or renaming of the subfolder list and/or file list in the corresponding secondary key, comprising:
    updating the meta-data information in the folder, which have been stored in database by the primary key.

5. The method according to claim 1, wherein prior to the recording of the meta-data information of the folder and storing of the meta-data information into the primary key, the method comprising:
    generating the corresponding secondary keys based on the primary key.

6. The method according to claim 5, wherein the meta-data information stored into the primary key comprises at least: the subfolder number, current maximum file ID, current data set, file deletion information and unix-timestamp of subfolders writing and the unix-timestamp of file writing.

7. The method according to claim 1, wherein the primary key is stored at a primary memory module, and the secondary key is stored at a secondary memory module within a storage apparatus.

8. An apparatus having at least a processor for processing file storage, comprises:
    a primary storage module which records meta-data information of a folder, and stores the meta-data information into key-value databases, wherein the key-value comprises at least a primary key with a first key value and a secondary key with a second key value:
        the primary key designates at least: a drive location, a user name and a parent folder name of the folder, and the first key value comprises metadata information of the primary key in string format,
        the secondary key comprises the drive location, the user name and the parent folder name of, and a first child folder name, and the second key value comprises metadata information of the secondary key in string format, wherein the first child folder comprises at least: one subfolder list and/or file list thereunder,
    a secondary storage module which stores contents of the at least one subfolder list and/or file list included under the folder into a corresponding location under the secondary keys and according to the secondary key value.

9. The apparatus according to claim 8, wherein each of the corresponding secondary keys separately stores corresponding contents of the at least one subfolder list and/or file list.

10. The apparatus according to claim 8, comprises:
    a processing module for adding, deleting or renaming the at least one subfolder list and/or file list in the corresponding secondary key under the folder; and
    an updating module for updating the meta-data information in the primary key.

11. The apparatus according to claim 8, comprises:
    a generation module for generating the corresponding secondary keys based on the primary key.

12. A non-transitory computer-readable medium having stored thereon, a computer program having at least one code section being executable by a machine for causing the machine to perform steps comprising:
    recording meta-data information generated for a folder, and storing the meta-data information of the folder into key-value databases, wherein the key-value comprises at least a primary key with a first key value and a secondary key with a second key value; and wherein:
        the primary key designates at least: a drive location, a user name and a parent folder name of the folder, and the first key value comprises metadata information of the primary key in string format,
        the secondary key comprises the drive location, the user name and the parent folder name of, and a first child folder name, and the second key value comprises metadata information of the secondary key in string format, wherein the first child folder comprises at least: one subfolder list and/or file list thereunder, wherein contents of the at least one subfolder list and/or file list are stored into a corresponding location under the secondary key and according to the secondary key value.

13. The non-transitory computer-readable medium according to claim 12, wherein each of the corresponding secondary keys separately stores corresponding contents of the at least one subfolder list and/or file list.

14. The non-transitory computer-readable medium according to claim 12, comprising:
    adding, deleting or renaming the at least one subfolder list and/or file list in the corresponding secondary key under the folder.

15. The non-transitory computer-readable medium according to claim 14, wherein the adding, deleting or renaming of the subfolder list and/or file list in the corresponding secondary key, comprising:
    updating the meta-data information in the primary key.

16. The non-transitory computer-readable medium according to claim 12, wherein prior to the recording of the meta-data information of the folder, storing of the meta-data information into the primary key, the method comprising:
    generating the corresponding secondary keys based on the primary key.

17. The non-transitory computer-readable medium according to claim 16, wherein the meta-data information stored into the primary key includes at least: current maximum file ID, current data set, file deletion information and timestamps when folders and files were written.

18. The non-transitory computer-readable medium according to claim 12, wherein the primary key is stored at a primary memory module, and the secondary key is stored at a secondary memory module within a storage apparatus.

* * * * *